US010511366B2

United States Patent
Xiao et al.

(10) Patent No.: US 10,511,366 B2
(45) Date of Patent: Dec. 17, 2019

(54) SIGNALING TRANSMISSION METHOD AND DEVICE FOR MULTIPLE-INPUT MULTIPLE-OUTPUT SYSTEM

(71) Applicant: ZTE CORPORATION, Shenzhen, Guangdong Province (CN)

(72) Inventors: Huahua Xiao, Shenzhen (CN); Yu Ngok Li, Shenzhen (CN); Jian Li, Shenzhen (CN); Yijian Chen, Shenzhen (CN); Peng Hao, Shenzhen (CN); Jun Xu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 230 days.

(21) Appl. No.: 15/506,257

(22) PCT Filed: Mar. 31, 2015

(86) PCT No.: PCT/CN2015/075533
§ 371 (c)(1),
(2) Date: Jun. 28, 2017

(87) PCT Pub. No.: WO2015/184915
PCT Pub. Date: Dec. 10, 2015

(65) Prior Publication Data
US 2017/0366243 A1    Dec. 21, 2017

(30) Foreign Application Priority Data
Aug. 25, 2014 (CN) .......................... 2014 1 0422694

(51) Int. Cl.
*H04B 7/04*      (2017.01)
*H04B 7/0456*    (2017.01)
(Continued)

(52) U.S. Cl.
CPC ......... *H04B 7/0486* (2013.01); *H04B 7/0469* (2013.01); *H04L 1/06* (2013.01);
(Continued)

(58) Field of Classification Search
CPC combination set(s) only.
See application file for complete search history.

(56) References Cited

U.S. PATENT DOCUMENTS 9,525,530 B2 * 12/2016 Kim ...................... H04L 5/0048
2014/0016497 A1 * 1/2014 Seo ...................... H04L 5/0023
                                                                   370/252

(Continued)

FOREIGN PATENT DOCUMENTS

CN      101127548 A    2/2008
CN      101494920 A    7/2009
(Continued)

OTHER PUBLICATIONS

Office Action dated Apr. 16, 2019 for Chinese Patent Application No. 201410422694.8 and English Translation.

*Primary Examiner* — Junpeng Chen
(74) *Attorney, Agent, or Firm* — Cantor Colburn LLP

(57) ABSTRACT

A signaling transmission method and apparatus for a Multiple-Input Multiple-Output MIMO system are provided. The method includes the following steps. Channel-Related Information CRI about a combined channel is formed according to CRI between all receiving antenna ports in a receiving network and a sending antenna port in a sending network. The CRI about the combined channel is sent to the sending network. Herein, the CRI includes one or more of the following: channel information, Channel State Information CSI, and a CSI Reference Signal CSI-RS.

12 Claims, 7 Drawing Sheets

(51) Int. Cl.
  *H04L 1/06* (2006.01)
  *H04L 5/00* (2006.01)
  *H04L 25/02* (2006.01)

(52) U.S. Cl.
  CPC .......... *H04L 5/0023* (2013.01); *H04L 5/0048* (2013.01); *H04L 25/0204* (2013.01); *H04L 25/0226* (2013.01)

(56) References Cited

U.S. PATENT DOCUMENTS

| | | |
|---|---|---|
| 2014/0177461 A1 | 6/2014 | Seyedmehdi et al. |
| 2014/0226582 A1* | 8/2014 | Zeng .................... H04B 7/0626 370/329 |
| 2015/0341092 A1* | 11/2015 | Park .................... H04B 7/0469 370/329 |
| 2016/0212643 A1* | 7/2016 | Park .................... H04B 7/0626 |
| 2017/0187507 A1* | 6/2017 | Yum ........................ H04B 7/04 |

FOREIGN PATENT DOCUMENTS

| | | |
|---|---|---|
| CN | 101827387 A | 9/2010 |
| CN | 101873161 A | 10/2010 |
| CN | 101882979 A | 11/2010 |
| CN | 101883075 A | 11/2010 |
| CN | 101958735 A | 1/2011 |
| CN | 102017487 A | 4/2011 |

\* cited by examiner

SIGNALING TRANSMISSION METHOD AND DEVICE FOR MULTIPLE-INPUT MULTIPLE-OUTPUT SYSTEM

TECHNICAL FIELD

The present disclosure relates to the field of wireless communications.

BACKGROUND

In a the wireless communication technology, when a first-class node, such as an eNode B, eNB, sends data by using multiple antennae, a spatial multiplexing mode may be used to improve a the data transmission rate may be improved by using a spatial multiplexing mode. That is, the first-class node transmits different data at different antenna positions by using the same time-frequency resources. A second-class node, such as User Equipment UE, also receives data by using multiple antennae. Resources of all the antennae are allocated to one user in a single-user situation, and the user monopolizes physical resources allocated by the eNB side in a transmission interval, and the transmission mode is called Single User Multiple-Input Multiple-Output SU-MIMO. Space resources of different antennae are allocated to different users in a multi-user situation, and one user and at least one of other users share the physical resources allocated by the eNB side in a transmission interval. Herein, a sharing mode may be a Spatial Division Multiple Access mode or Spatial Division Multiplexing mode, and the transmission mode is called Multiple User Multiple-Input Multiple-Output MU-MIMO. Herein, the physical resources allocated by the eNB side are time-frequency resources, as shown in FIG. 1.

In a Long Term Evolution LTE system, Channel State Information CSI reflecting a downlink physical channel state has three forms: a Channels Quality Indication CQI, a Pre-coding Matrix Indicator PMI) and a Rank Indicator RI.

The CQI is an index for measuring the quality of the downlink channel. In the related art, the CQI is expressed by using integral values 0-15, which represent different CQI grades respectively. Different CQIs correspond to respective Modulation and Coding Schemes MCS, which is divided into 16 situations and may be expressed by using 4 bit information.

The PMI refers to that the eNB is informed to use what type of pre-coding matrix for pre-coding of a Physical Downlink Shared Channel, PDSCH, of the UE according to the measured quality of channel only in a transmission mode namely closed-loop spatial multiplexing. The feedback granularity of the PMI may be the feedback granularity of one PMI based on an entire bandwidth, or may be the feedback granularity of one PMI based on a subband.

The RI is used for describing the number of spatial independent channels, and corresponds to rank of channel responding matrix. Under an open-loop spatial multiplexing mode and a closed-loop spatial multiplexing mode, the UE needs to feed back RI information, and under other modes, the UE does not need to feed back the RI information. A rank of a channel matrix corresponds to the number of layers, and therefore feeding back, by the UE, the RI information to the eNB refers to feeding back the number of downlink transmission layers.

A transmission layer is a concept of multi-antenna "layer" in the LTE and an LTE-A, and represents the number of effective valid independent channels in spatial multiplexing. The total number of transmission layers is a rank of spatial channels. Under the SU-MIMO mode, resources of all antennae are allocated to one user, and the number of layers used for transmitting MIMO data is equal to a rank used by the eNB for transmitting the MIMO data. Under the MU-MIMO mode, the number of layers used for transmission in correspondence to of one user is smaller than the total number of layers used by the eNB for transmitting the MIMO data. If the SU-MIMO mode and the MU-MIMO mode need to be switched, the eNB needs to inform the UE of different control data under different transmission modes.

Device-to-Device D2D communication is a technology for direct communication between terminals. The main features are that: a certain device in multiple devices under network coverage and within a short distance may find other devices in a wireless manner, and direct connection and communication between the devices can be realized. The D2D communication shares resources with cell users under the control of a cell network, and therefore the utilization rate of spectrum will be improved. In addition, the D2D communication can also bring the advantages including: alleviating burdens on a cellular network, reducing the power consumption of a battery of a mobile terminal, improving a bit rate, improving the fault robustness of a network infrastructure and the like, and further supporting novel small-scale point-to-point data service.

In an actual communication system, the first-class node, such as the eNB side, may adopt multiple transmitting and receiving antennae. Due to limitation of factors such as volume and cost and the like, the second-class node, such as the user side, will not be configured with too many antennae usually, so the advantages of the MIMO technology cannot be fully played.

According to an uplink virtual MIMO method proposed at present, multiple second-class nodes are combined to form a virtual MIMO channel in the same time-frequency resource, and send data to an eNB having multiple antennae in a combination way. When the distance between the second-class nodes is large enough, channels where different second-class nodes reach the first-class node may be regarded to be unrelated. Therefore, the factors such as volume and cost are overcome.

The virtual MIMO is divided into two types, i.e., collaborative virtual MIMO and non-collaborative virtual MIMO. The collaborative virtual MIMO refers to that data between the second-class nodes may be shared. A virtual multi-antenna system is formed by sharing respective antennae. An uplink collaborative virtual MIMO technology in the related art mainly implements an MIMO diversity function. The non-collaborative virtual MIMO refers to that data between the second-class nodes cannot be shared, and independent data streams are sent to the first-class node respectively instead. In the non-collaborative virtual MIMO, the first-class node selects several second-class nodes for pairing according to channel situation of the second-class nodes, and the paired second-class nodes send data to the eNB on the same time-frequency resource, and the first-class node distinguishes different second-class nodes by means of multiple antennae, which is similar to downlink MU-MIMO to some extent. The non-collaborative virtual MIMO mainly implements an MIMO multiplexing function.

The virtual MIMO technology is usually suggested to be applied to an uplink where the second-class nodes send data to the first-class node, and the virtual MIMO technology adopts a non-collaborative mode usually.

As shown in FIG. 2, the downlink virtual MIMO may share receiving antennae of multiple second-class nodes to form a virtual second-class node. The virtual second-class node is similar to an SU-MIMO receiver. Due to low interlayer interference, compared to the MU-MIMO as which the multiple second-class nodes are used, the virtual second-class node can obtain a better link performance and a larger downlink throughput, which is greatly advantageous in improvement of a communication situation of a hotspot region where second-class nodes are relatively dense. However, the downlink virtual MIMO is collaborative virtual MIMO essentially, and the second-class nodes need to share information received from the first-class node and perform combined demodulation and decoding. The data sharing is performed by means of a D2D wireless link and other wireless links usually. Thus, the second-class nodes for performing virtual MIMO are certainly limited to some extent, for example, the second-class nodes are relatively close to each other in geographical location, and they are in one cluster usually. The cluster here refers to a set of the second-class nodes relatively close to each other in geographical location. One of the set of the second-class nodes may share channel information and/or received data with one of other second-class nodes at least. If the activation number of second-class nodes in a cluster is small or channels therebetween are relatively related, even if they were performed the virtual MIMO pairing to form a virtual node, the performance improvement is not obvious probably. Since the MU-MIMO does not need data interaction between the second-class nodes, second-class nodes may be selected from different clusters for pairing to form the MU-MIMO. The performance of the MU-MIMO is probably better than the performance of the virtual MIMO in which pairing is performed in the same cluster.

In addition, as shown in FIG. 3, when there are few first-class node antennae, to pair, sometimes, other second-class nodes to improve the performance, it is necessary to limit the number of receiving antenna ports of a second-class node having more receiving antennae. That is, some receiving antenna ports of the second-class node constitute a virtual MIMO to transmit and receive data. Here, an MIMO mode in such a form is also called virtual MIMO, and the second-class node is called virtual port node.

However, current transmission solutions do not include a data transmission solution for forming MU-MIMO by pairing between virtual second-class nodes and second-class nodes of other clusters or virtual second-class nodes, and also do not include a data transmission solution for forming the MU-MIMO by means of some second-class nodes in one cluster.

SUMMARY

A summary for a subject describing the present disclosure in detail is given below. The present summary is not intended to limit the scope of protection of claims.

The embodiments of the present disclosure provide a signaling transmission method and apparatus for a Multiple-Input Multiple-Output MIMO system, which can form a combined channel according to Channel-Related Information CRI to constitute an MIMO system for transmitting data.

The embodiments of the present disclosure adopt the following technical solution.

A signaling transmission method for an MIMO system is provided, which is applied to a receiving network. The signaling transmission method includes the following steps.

CRI about a combined channel is formed according to CRI between all receiving antenna ports in a receiving network and a sending antenna port in a sending network.

The CRI about the combined channel is sent to the sending network.

The CRI includes one or more of the following: channel information, Channel State Information CSI, and a CSI Reference Signal CSI-RS.

In an exemplary embodiment, the step that CRI about a combined channel is formed according to CRI between receiving antenna ports in a receiving network and a sending antenna port in a sending network includes the following steps.

The receiving antenna ports receive CSI-RS sent by the sending antenna port.

A receiving antenna port set corresponding to the CRI about the combined channel and a second-class node set corresponding to the receiving antenna port set are determined according to the received CSI-RS.

CRI between the second-class node set and the sending antenna port is determined as CRI about the set.

The CRI about the combined channel is formed according to the CRI about the set and the receiving antenna ports.

In an exemplary embodiment, when the second-class node set includes multiple second-class nodes, the step that the CRI about the combined channel is formed according to the CRI about the set and the receiving antenna ports includes the following steps.

Each second-class node in the second-class node set calculates to obtain CRI of each receiving port corresponding to the second-class node according to the received CSI-RS, and feeds back the CRI of each receiving port of the node to a comprehensive node, and the comprehensive node forms the CRI about the combined channel by taking the CRI of each receiving port of each second-class node as an element of the CRI about the combined channel according to the received CRI of each receiving port of all second-class nodes in the second-class node set.

The comprehensive node is one of the following: a centralized processing device not connected to a current mobile communication network, or a second-class node in the second-class node set, or a second-class node out of the second-class node set.

In an exemplary embodiment, when the second-class node set includes a second-class node and the receiving antenna port set includes all receiving antenna ports of the second-class node, the step that the CRI about the combined channel is formed according to the CRI about the set and the receiving antenna ports includes the following step.

The second-class node calculates to obtain CRI of each receiving port according to the received CSI-RS, and forms the CRI about the combined channel by taking the CRI of each receiving port of the second-class node as an element of the CRI about the combined channel.

In an exemplary embodiment, when the second-class node set includes a second-class node and the receiving antenna port set includes some receiving antenna ports of the second-class node, the step that the CRI about the combined channel is formed according to the CRI about the set and the receiving antenna ports includes the following step.

The second-class node calculates to obtain CRI of the some receiving ports according to the received CSI-RS, and forms the CRI about the combined channel by taking the CRI of each receiving port corresponding to the receiving antenna port set as an element of the CRI about the combined channel.

In an exemplary embodiment, the CRI about the combined channel corresponds to an MIMO channel configuration, and the MIMO channel configuration includes an index set of second-class nodes, an index set of receiving antenna ports, or an index of a single second-class node.

An embodiment of the present disclosure also provides a signaling transmission method for an MIMO system, which is applied to a sending network side and includes the following steps.

CRI about a combined channel is received.

An MIMO transmission mode of a receiving antenna port corresponding to the CRI about the combined channel is determined according to the CRI about the combined channel.

MIMO channel configuration information of the receiving antenna port is determined.

In an exemplary embodiment, the step that an MIMO transmission mode of a receiving antenna port corresponding to the CRI about the combined channel is determined according to the CRI includes the following steps.

A channel capacity of the receiving antenna port corresponding to the CRI about the combined channel is calculated.

An MIMO transmission mode having the maximum channel capacity, which is obtained by calculation, is determined as the MIMO transmission mode.

In an exemplary embodiment, the MIMO transmission mode includes a transmission mode of a single second-class node, an MIMO transmission mode where multiple second-class nodes perform transmission under same time-frequency and receiving antenna ports do not share received data, and an MIMO transmission mode where multiple second-class nodes perform transmission under the same-time frequency and receiving antenna ports share received data.

An embodiment of the present disclosure also provides a signaling transmission apparatus for an MIMO system, which is arranged in a receiving network and includes a forming unit and a sending unit.

The forming unit is arranged to form CRI about a combined channel according to CRI between all receiving antenna ports in a receiving network and a sending antenna port in a sending network.

The sending unit is arranged to send the CRI about the combined channel to the sending network.

The CRI includes one or more of the following: channel information, CSI, and a CSI-RS.

In an embodiment, the forming unit includes a first receiving module, an analysis module, a determination module and a combined channel forming module.

The first receiving module is arranged to receive CSI-RS sent by the sending antenna port.

The analysis module is arranged to determine a receiving antenna port set corresponding to the CRI about the combined channel and a second-class node set corresponding to the receiving antenna port set according to the received CSI-RS.

The determination module is arranged to determine CRI between the second-class node set and the sending antenna port as CRI about the set.

The combined channel forming module is arranged to form the CRI about the combined channel according to the CRI about the set and the receiving antenna ports.

In an exemplary embodiment, the first receiving module is further arranged to receive MIMO channel configuration information sent by the sending network.

An embodiment of the present disclosure also provides a signaling transmission apparatus for an MIMO system, which is arranged in a sending network and includes a receiving unit, a determination unit and an indication unit.

The receiving unit is arranged to receive CRI about a combined channel.

The determination unit is arranged to determine an MIMO transmission mode of a receiving antenna port corresponding to the CRI about the combined channel according to the CRI about the combined channel.

The indication unit is arranged to determine MIMO channel configuration information of the receiving antenna port.

In an exemplary embodiment, the determination unit includes a calculation module and a comparison module.

The calculation module is arranged to calculate a channel capacity of channel information and/or CSI and/or a CSI-RS in the CRI about the combined channel.

The comparison module is arranged to determine an MIMO transmission mode having the maximum channel capacity, which is obtained by calculation, as the MIMO transmission mode.

An embodiment of the present disclosure also provides a computer-readable storage medium. A computer-executable instruction is stored in the computer-readable storage medium. The computer-executable instruction is used for executing the above-mentioned method.

Compared with the related art, the embodiments of the present disclosure have the following beneficial effects.

According to the signaling transmission method and apparatus for an MIMO system in the embodiments of the present disclosure, a receiving network receives a CSI-RS of a sending network, calculates CRI, and forms the CRI about the combined channel by using the calculated CRI; and the sending network forms an MIMO configuration according to the CRI about the combined channel. Therefore, a higher diversity or multiplexing gain can be obtained.

After the accompanying drawings and detailed descriptions are read and understood, other aspects may be understood.

DETAILED DESCRIPTION

The embodiments of the present disclosure will be illustrated herein below in combination with the accompanying drawings. It needs to be noted that the embodiments in the present application and the features in the embodiments may be combined without conflicts.

In the embodiments of the present disclosure, a first-class node includes, but is not limited to, various wireless communication devices, such as a macro eNB, a micro eNB and a wireless access point and the like.

A second-class node includes, but is not limited to, various terminals, such as a data card, a mobile phone, a notebook computer, a personal computer, a tablet computer, a personal digital assistant and a Bluetooth device and the like, and various wireless communication devices such as a relay, a radio remote device and a wireless access point and the like.

Figure 8:
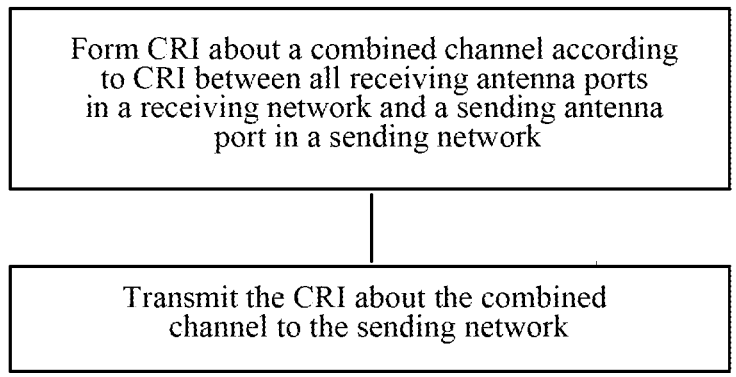
FIG. 8 is a flowchart of a signaling transmission method for an MIMO system according to an embodiment of the present disclosure.

As shown in FIG. 8, a signaling transmission method for an MIMO system is applied to a receiving network side and includes the following steps.

CRI about a combined channel is formed according to CRI between all receiving antenna ports in a receiving network and a sending antenna port in a sending network.

The CRI about the combined channel is sent to the sending network.

The CRI includes one or more of the following: channel information, CSI, and a CSI-RS.

The present embodiment is applied to a system including a sending network and a receiving network. Herein, the sending network includes K first-class nodes $BS_1, \ldots, BS_K$, and the K first-class nodes include T sending antenna ports $TP_1, TP_2, \ldots, TP_T$. The receiving network includes a system constituted by N second-class nodes $UE_1, UE_2, \ldots, UE_N$, and the N second-class nodes include R receiving antenna ports $RP_1, RP_2, \ldots, RP_R$. Here, K, N, T and R are positive integers greater than or equal to 1, and K is smaller than or equal to T, and N is smaller than or equal to R.

The method is expressed as follows.

The receiving network forms the CRI about the combined channel $S_1, \ldots, S_L$ according to CRI $H_1, \ldots, H_R$ between receiving antenna ports and sending antenna ports, and feeds back the CRI about the combined channel $S_1, \ldots, S_L$ to the sending network.

Herein, $1 \leq L \leq R$, $H_i$ is CRI between T sending antenna ports and an $i^{th}$ receiving antenna port, and is a T-dimension row vector, $i=1, \ldots, R$.

The CRI about the combined channel $S_l$ includes $N_l$ row vectors $S_{l,k}$, and corresponds to a receiving port index set $\Theta_l = \{I_1, \ldots, I_{N_l}\}$. Herein, $\Theta_l$ does not have same elements, $I_k$ is an element in a set $\{1, \ldots, R\}$, and $S_{l,k}$ is CRI $H_{I_k}$ between an $I_k$ th receiving antenna port and a sending antenna port. Here, $k=1, \ldots, N_l$, and $N_l \leq 1$, and $N_l$ is a row number of the CRI about the combined channel $S_l$, $l \leq 1, \ldots, L$, and L is the number of pieces of the CRI about the combined channel.

Herein, the pieces of the CRI about the combined channel $S_l$ and $S_j$ at least have one different row vector. Herein, $1 \leq l, j \leq L$, $l \neq j$, and L is an integer greater than or equal to 1.

In an exemplary embodiment, the step of forming CRI about a combined channel according to CRI between receiving antenna ports in a receiving network and a sending antenna port in a sending network includes the following steps.

The receiving antenna ports receive CSI-RSs sent by the sending antenna ports.

A receiving antenna port set corresponding to the CRI about the combined channel and a second-class node set corresponding to the receiving antenna port set are determined according to the received CSI-RSs.

CRI between the second-class node set and the sending antenna ports is determined as CRI about the set.

The CRI about the combined channel is formed according to the CRI about the set and the receiving antenna ports.

The method is expressed as follows.

A second-class node set $\Omega_l$ corresponding to the receiving antenna port set $\Theta_l$ corresponding to the CRI about the combined channel $S_l$ is determined.

The second-class node set $\Omega_l$ receives a CSI-RS sent by a sending antenna port.

CRI H between the second-class node set $\Omega_l$ and the sending antenna port is obtained by calculating according to the received CSI-RS. Herein, H is an $R_l \times T$-dimension plural matrix, and $R_l$ is the number of all receiving antenna ports corresponding to second-class nodes in the second-class node set $\Omega_l$.

The CRI about the combined channel $S_l$ is formed according to the CRI H and a receiving antenna port $\Theta_l$.

In an exemplary embodiment, when the second-class node set includes multiple second-class nodes, the step of forming the CRI about the combined channel according to the CRI about the set and the receiving antenna ports includes the following steps.

Each second-class node in the second-class node set calculates to obtain CRI of each receiving port corresponding to the second-class node according to the received CSI-RSs, and feeds back the CRI of each receiving port of the node to a comprehensive node, and the comprehensive node takes the CRI of each receiving port of each second-class node as an element of CRI about a combined channel to form the CRI about the combined channel according to the received CRI of each receiving port of all second-class nodes in the second-class node set.

The comprehensive node is one of the following: a centralized processing device not connected to a current mobile communication network, or a second-class node in the second-class node set, or a second-class node out of the second-class node set.

The CRI about the combined channel $S_l$ is formed according to CRI $H_1, \ldots, H_R$, and the second-class node set $\Omega_l$ has multiple second-class nodes. The process is as follows.

A second-class node in the second-class node set $\Omega_l$ calculates to obtain CRI according to the received CSI-RS, and feeds back the CRI to the comprehensive node, and the comprehensive node receives the CRI. The comprehensive node takes the CRI of each receiving port of each second-class node as a row of $S_j$ to form a combined channel $S_j$ according to the received CRI of each receiving port of all second-class nodes in the second-class node set $\Omega_l$.

Herein, the comprehensive node includes at least one of the following: a centralized processing device not connected to a current mobile communication network, or a second-class node in the second-class node set $\Omega_l$, or a second-class node out of the second-class node set $\Omega_l$.

When the second-class node set includes a second-class node and the receiving antenna port set includes all receiving antenna ports of the second-class node, the step that CRI about the combined channel is formed according to the CRI about the set and the receiving antenna ports includes the following step.

The second-class node calculates to obtain CRI of each receiving port according to the received CSI-RSs, and takes the CRI of each receiving port of the second-class node as an element of CRI about a combined channel to form CRI about the combined channel.

The CRI about the combined channel $S_l$ is formed according to the CRI $H_1, \ldots, H_R$, and the second-class node set $\Omega_l$ has only one second-class node, and the receiving antenna port $\Theta_l$ includes all receiving ports of the second-class node. The process is as follows.

The second-class node calculates to obtain CRI according to the received CSI-RSs, and uses each row of the CRI to constitute $S_l$.

When the second-class node set includes a second-class node and the receiving antenna port set includes some receiving antenna ports of the second-class node, the step that CRI about the combined channel is formed according to the CRI about the set and the receiving antenna ports includes the following step.

The second-class node calculates to obtain CRI of some receiving ports according to the received CSI-RSs, and takes the CRI of each receiving port corresponding to the receiving antenna port set as an element of the CRI about the combined channel to form the CRI about the combined channel.

In an exemplary embodiment, the CRI about the combined channel $S_l$ is formed according to the CRI $H_1, \ldots, H_R$, and the second-class node set $\Omega_l$ has only one second-class node, and the receiving antenna port $\Theta_l$ includes some receiving ports of the second-class node. The process is as follows.

The second-class node calculates to obtain CRI according to the received CSI-RSs, and takes CRI corresponding to each receiving antenna port in the receiving antenna port set $\Theta_l$ as a row to form $S_l$.

The CRI about the combined channel $S_1, \ldots, S_L$ corresponds to an MIMO channel configuration $M_1, \ldots, M_L$ respectively. The MIMO channel configuration includes an index set of second-class nodes, an index set of receiving antenna ports, or an index of a single second-class node.

Figure 9:
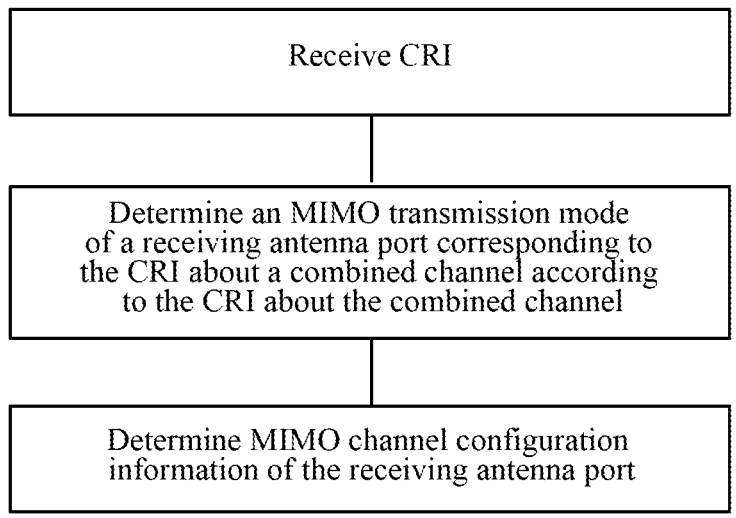
FIG. 9 is a flowchart of another signaling transmission method for an MIMO system according to an embodiment of the present disclosure.

As shown in FIG. 9, signaling transmission method for an MIMO system is applied to a sending network side and includes the following steps.

CRI about a combined channel is received.

An MIMO transmission mode of a receiving antenna port corresponding to the CRI about the combined channel is determined according to the CRI about the combined channel.

MIMO channel configuration information about the receiving antenna port is determined.

The method is expressed as follows.

A sending network receives CRI about the combined channel $S_1, \ldots, S_L$, determines an MIMO transmission mode according to the CRI about the combined channel $S_1, \ldots, S_L$, determines an MIMO channel configuration, and sends the MIMO channel configuration to a second-class node in a receiving network.

In an exemplary embodiment, the step that an MIMO transmission mode of a receiving antenna port corresponding to the CRI about the combined channel is determined according to the CRI includes the following steps.

A channel capacity of the receiving antenna port corresponding to the CRI about the combined channel is calculated.

A MIMO transmission mode, obtained by calculating, having the maximum channel capacity is determined as the MIMO transmission mode.

The MIMO transmission mode includes a transmission mode of a single second-class node, an MIMO transmission mode where multiple second-class nodes perform transmission on the same time-frequency resource and receiving antenna ports do not share received data, and an MIMO transmission mode where multiple second-class nodes perform transmission on the same time-frequency resource and receiving antenna ports share received data.

The MIMO transmission mode where multiple second-class nodes perform transmission on the same time-frequency resource and receiving antenna ports share received data is the virtual MIMO. Herein, a second-class node in a second-class node set constituting the virtual MIMO at least needs to share CRI and perform combined demodulation and decoding with another second-class node in the second-class node set.

Figure 10:
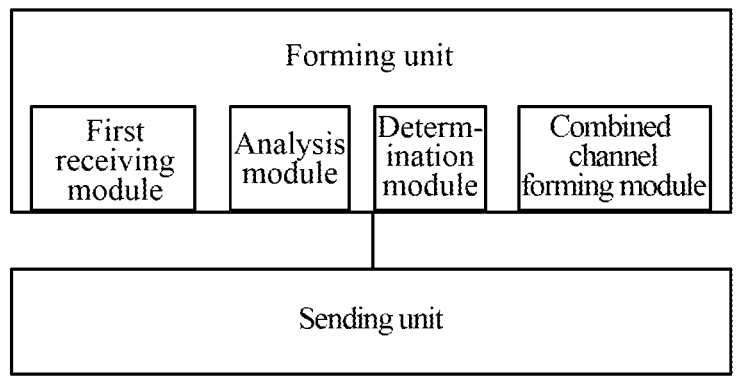
FIG. 10 is a structural diagram of a signaling transmission apparatus for an MIMO system according to an embodiment of the present disclosure.

As shown in FIG. 10, a signaling transmission apparatus for an MIMO system is arranged in a receiving network side, and includes a forming unit and a sending unit.

The forming unit is arranged to form CRI about a combined channel according to CRI between all receiving antenna ports in a receiving network and a sending antenna port in a sending network.

A sending unit is arranged to send the CRI about the combined channel to the sending network.

The CRI includes one or more of the following: channel information, CSI, and a CSI-RS.

The forming unit includes a first receiving module, an analysis module, a determination module and a combined channel forming module.

The first receiving module is arranged to receive CSI-RSs sent by the sending antenna ports.

The analysis module is arranged to determine a receiving antenna port set corresponding to the CRI about the combined channel and a second-class node set corresponding to the receiving antenna port set according to the received CSI-RSs.

The determination module is arranged to determine CRI between the second-class node set and the sending antenna port as CRI about the set.

The combined channel forming module is arranged to form CRI about the combined channel according to the CRI about the set and the receiving antenna ports.

The first receiving module is further arranged to receive MIMO channel configuration information sent by the sending network.

Figure 11:
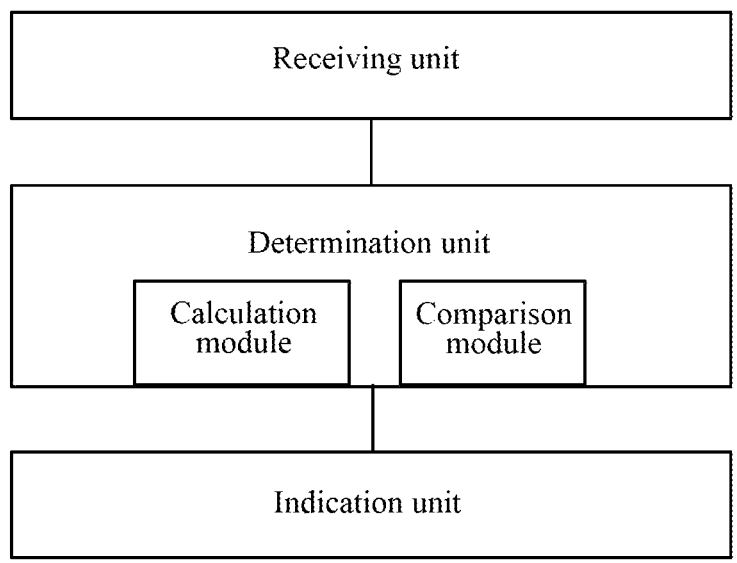
FIG. 11 is a structural diagram of another signaling transmission apparatus for an MIMO system according to an embodiment of the present disclosure.

As shown in FIG. 11, a signaling transmission apparatus for an MIMO system is arranged in a sending network, and includes a receiving unit, a determination unit and an indication unit.

The receiving unit is arranged to receive CRI about a combined channel.

The determination unit is arranged to determine an MIMO transmission mode of a receiving antenna port corresponding to the CRI about the combined channel according to the CRI about the combined channel.

The indication unit is arranged to determine MIMO channel configuration information of the receiving antenna port.

The determination unit includes a calculation module and a comparison module.

The calculation module is arranged to calculate a channel capacity of channel information and/or CSI and/or a CSI-RS in the CRI about the combined channel.

The comparison module is arranged to determine the MIMO transmission mode, obtained by calculating, having the maximum channel capacity as the MIMO transmission mode.

The embodiments of the present disclosure are specifically illustrated herein below.

Figure 4:
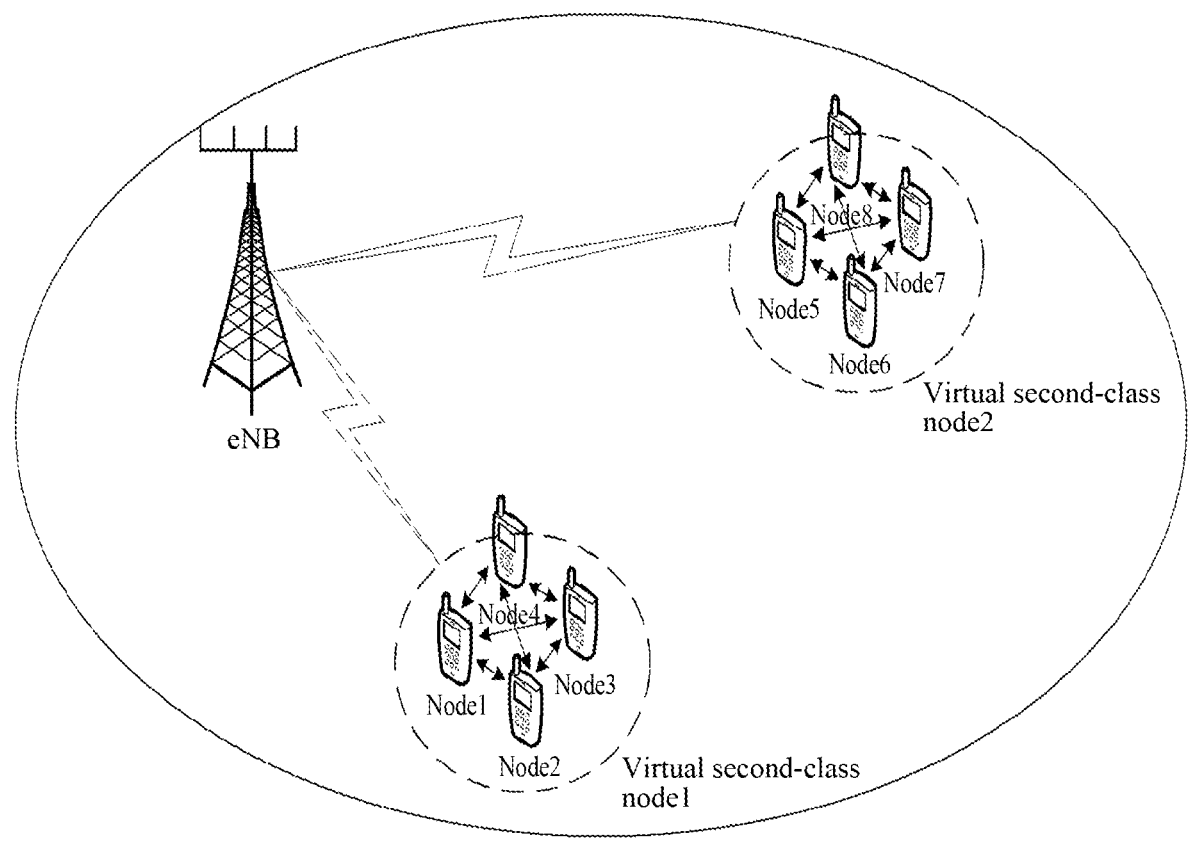
FIG. 4 is a schematic diagram of MU-MIMO formed by two virtual nodes according to an embodiment of the present disclosure.

In a wireless system, a sending network has two eNBs, and there is at least one cluster under the eNBs, and each cluster has multiple second-class nodes, for example, devices, such as a relay, a wireless access point, a small eNB or a home eNB or the like, a mobile phone, a data card, and a notebook computer and so on. To facilitate description, the second-class nodes are called nodes for short here. As shown in FIG. 4, there are two clusters in a cell, and each cluster has four nodes. Herein, users in the first cluster are signed as node 1 to node 4, and users in the second cluster are signed as node 5 to node 8. The distance between the nodes in each cluster is relatively short. The distance between different clusters is relatively long. The nodes in the same cluster may communicate by means of wireless Backhual to form virtual MIMO. Nodes constituting multiple virtual MIMO form a virtual second-class node jointly, and will share received data information and channel information to realize combined demodulation and decoding. Under the hypothesis of ideal Backhual, they will be similar to the SU-MIMO, and under the hypothesis of non-ideal Backhual, the performance will be lost to some extent. In a downlink virtual MIMO system, a downlink virtual receiving terminal formed by multiple terminals can obtain a higher diversity or multiplexing gain due to more receiving antennae. In a scenario as shown in FIG. 4, it is supposed that each node has only one receiving antenna, and if SU-MIMO is adopted, at most one layer is adopted for transmission of each terminal by the eNB; and however, the virtual second-class node formed by node 1 to node 4 has four antennae, and at most four layers are adopted for transmission. Therefore, the multiplexing gain is obviously improved. Since for the MU-MIMO it is required that equivalent channels between various users must be strictly orthogonal to ensure that users do not interfere, which is difficult to achieve actually, the performance of MU-MIMO will be greatly reduced. Compared with MU-MIMO, downlink virtual MIMO has the advantages that users will not interfere mutually, so the performance is better than that of the MU-MIMO. Different from SU-MIMO and MU-MIMO, data received from respective antennae will be shared between the terminals in the downlink virtual MIMO in the present disclosure, and sending, receiving and demodulation of data need to be achieved by means of signaling. A specific signaling transmission scenario will be elaborated below.

The present embodiment describes a flow of information interaction of a virtual second-class node to feed back CRI about the combined channel. In FIG. 4, there are two clusters, and signaling interaction flows of both clusters are similar. So, a signaling transmission process of a virtual second-class node in one cluster is only described here for illustrations.

Embodiment One

Figure 5:
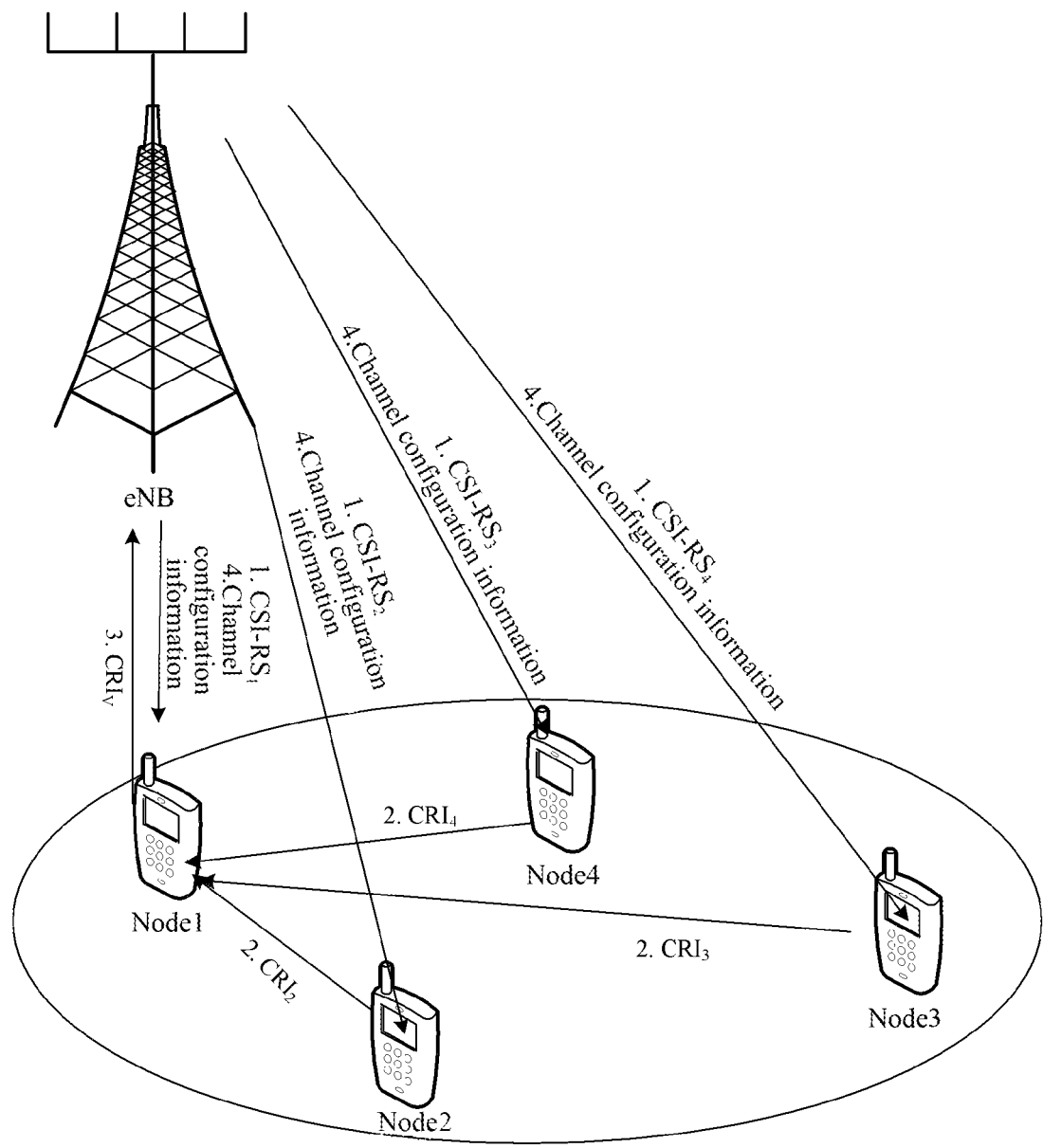
FIG. 5 is a schematic diagram of signaling transmission of a virtual second-class node according to embodiment one of the present disclosure.

As shown in FIG. 5, in the virtual MIMO, there are at least four nodes in a first cluster. Herein, node 1, node 2, node 3 and node 4 are combined to form a virtual second-class node, and two eNBs send CSI-RSs CSI-RS1, CSI-RS2, CSI-RS3 and CSI-RS4 to node 1, node 2, node 3 and node 4 respectively.

Node i calculates to obtain CRI, i.e., CRI2, CRI3 and CRI4 between the node I and downlinks of all sending ports of the two eNBs according to received CSI-RSi, and sends the CSI (i.e., CRI2, CRI3 and CRI4) to node 1. Here, node 1 is a comprehensive node, i=2, 3, 4.

Node 1 calculates to obtain the CRI about the combined channel, i.e., CRIV, of a downlink virtual MIMO system according to the received CRI sent by node 2, node 3 and node 4 in combination with CRI1 information obtained by self-calculating according to CSI-RS1, and feeds back the information to the eNB.

The eNB receives the CRI about the combined channel fed back by the virtual second-class node, and the CRI about the combined channel of the second-class nodes, the virtual second-class node and a virtual port node in each cluster served thereby. An MIMO channel capacity under at least one piece of information about the combined channel is calculated, and an index set of second-class nodes corresponding to the information about the combined channel having the maximum channel capacity is served as an MIMO channel configuration. Moreover, the corresponding MIMO configuration is served as the MIMO channel configuration of the eNB.

The eNB sends the MIMO configuration information to the second-class nodes, and sends data to the scheduled second-class nodes according to a transmission mode specified by the MIMO configuration. The second-class nodes perform demodulation and decoding according to the received MIMO configuration information and the received data information. If it is the virtual MIMO, combined demodulation and decoding needs to be performed. Otherwise, only a single second-class node is needed to perform demodulation and decoding.

It needs to be noted that the channel capacity here may be other technical indexes such as a signal-to-noise ratio, channel quality, a signal-to-interference and noise ratio, a bit error rate, a block error rate, and a frame error rate.

It needs to be noted that it is only illustrated herein with an example that four nodes constitute a virtual second-class node. However, the embodiments of the present disclosure not only are applied to a situation of four nodes, but also may be applied to a situation of more than one node.

It needs to be noted that a situation of two first-class nodes is only listed herein. However, the embodiments of the present disclosure not only are applied to a situation of two first-class nodes, but also may be applied to a situation of more than or equal to one second-class node.

The CRI in the present embodiment includes at least one of CSI, channel information, and a CSI-RS.

If the CRI is the CSI, the CRI includes CSI1\PMI1\CQI1\RI1 of node 1, CSI2\PMI2\CQI2\RI2 of node 2, PMI3\CQI3\RI3 of node 3, and PMI4\CQI4\RI4 of node 4.

If the CRI is the channel information, the CRI includes a channel matrix H1 of node 1, a channel matrix H2 of node 2, a channel matrix H3 of node 3, and a channel matrix H4 of node 4. Herein, H1, H2, H3 and H4 are plural matrices of $NR_i \times NT$, and here NT is the number of sending antennae of all eNBs, $NR_i$ is the number of receiving antennae of node i, i=1, 2, 3, 4.

If the CRI is the CSI-RS, the CRI includes CSI-RS1 of node 1, CSI-RS2 of node 2, CSI-RS3 of node 3, and CSI-RS4 of node 4. The comprehensive node needs to calculate to obtain information about a combined channel according to reference channel information and sends the information about the combined channel to the eNB, or directly sends the reference information to the eNB to make the eNB calculate the information about the combined channel according to the reference channel information.

Embodiment Two

The present embodiment describes a flow of information interaction of a virtual second-class node to feed back CRI about the combined channel. In FIG. 4, there are two clusters. Herein, signaling interaction flows of both clusters are similar. Therefore, a signaling transmission process of a virtual second-class node in one cluster is only described here for illustrations.

Figure 6:
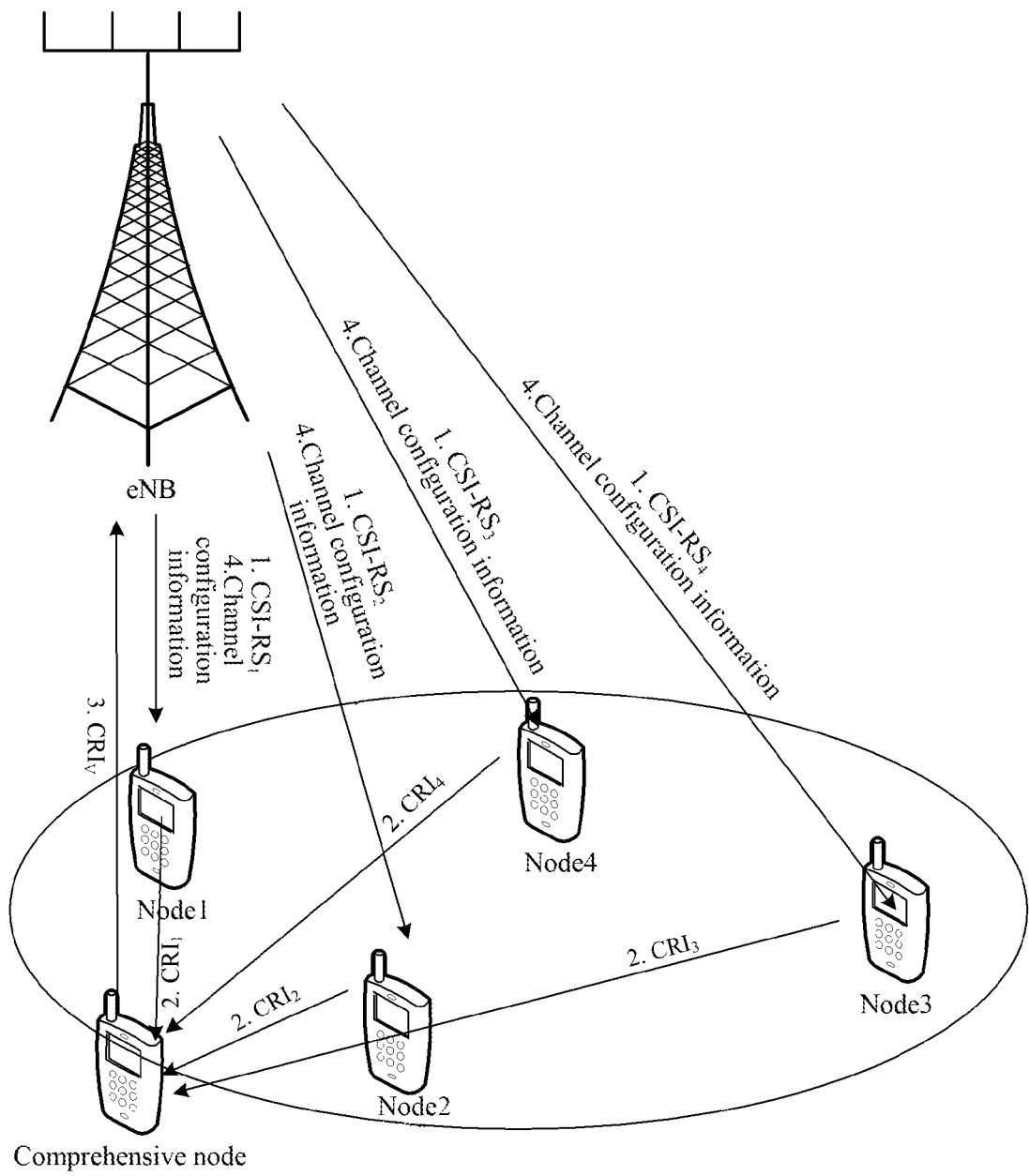
FIG. 6 is a schematic diagram of signaling transmission of a virtual second-class node according to embodiment two of the present disclosure.

As shown in FIG. 6, in the virtual MIMO, there are at least four nodes in a first cluster. Herein, node 1, node 2, node 3 and node 4 are combined to form a virtual second-class node, and an eNB sends CSI-RSs, i.e., CSI-RS1, CSI-RS2, CSI-RS3 and CSI-RS4 to node 1, node 2, node 3 and node 4 respectively.

Node 1, node 2, node 3 and node 4 calculate to obtain downlink CRI, i.e., CRI1, CRI2, CRI3 and CRI4 according to the received CSI-RS1, CSI-RS2, CSI-RS3 and CSI-RS4 respectively, and send the CSI to a comprehensive node. Here, the comprehensive node is a node out of node 1 to node 4 or a centralized processing device not connected to a current mobile communication network.

The comprehensive node calculates to obtain CRI about the combined channel, i.e., CRIV of a downlink virtual MIMO system according to the received CRI sent by node 1, node 2, node 3 and node 4, and feeds back the information to the eNB.

The eNB receives the CRI about the combined channel fed back by the virtual second-class node, and the CRI about the combined channel of the second-class nodes, the virtual second-class node and a virtual port node in each cluster served thereby. An MIMO channel capacity under at least one piece of information about the combined channel is calculated, and an index set of second-class nodes corresponding to the information about the combined channel having the maximum channel capacity is served as an MIMO channel configuration. Moreover, the corresponding MIMO configuration is served as the MIMO channel configuration of the eNB.

The eNB sends the MIMO configuration information to the second-class nodes, and sends data to the scheduled second-class nodes according to a transmission mode specified by the MIMO configuration. The second-class nodes perform demodulation and decoding according to the received MIMO configuration information and the received data information. If it is the virtual MIMO, combined demodulation and decoding needs to be performed. Otherwise, only a single second-class node is needed to perform demodulation and decoding.

It needs to be noted that the channel capacity here may be other technical indexes such as a signal-to-noise ratio, channel quality, a signal-to-interference and noise ratio, a bit error rate, a block error rate, and a frame error rate.

It needs to be noted that it is only illustrated herein with an example that four nodes constitute a virtual second-class node. However, the present disclosure not only is applied to a situation of four nodes, but also may be applied to a situation of more than one node.

It needs to be noted that a situation of two first-class nodes is only listed herein. However, the present disclosure not only is applied to a situation of two first-class nodes, but also may be applied to a situation of more than or equal to one second-class node.

The CRI in the present embodiment includes at least one of CSI, channel information, and a CSI-RS.

If the CRI is the CSI, the CRI includes CSI1\PMI1\CQI1\RI1 of node 1, CSI2\PMI2\CQI2\RI2 of node 2, PMI3\CQI3\RI3 of node 3, and PMI4\CQI4\RI4 of node 4.

If the CRI is the channel information, the CRI includes a channel matrix H1 of node 1, a channel matrix H2 of node 2, a channel matrix H3 of node 3, and a channel matrix H4 of node 4. Herein, H1, H2, H3 and H4 are plural matrices of $NR_i \times NT$. Here, NT is the number of sending antennae of all eNBs, and $NR_i$ is the number of receiving antennae of node I; and i=1, 2, 3, 4.

If the CRI is the CSI-RS, the CRI includes CSI-RS1 of node 1, CSI-RS2 of node 2, CSI-RS3 of node 3, and CSI-RS4 of node 4. The comprehensive node needs to calculate to obtain information about the combined channel according to reference channel information and sends the information to the eNB, or directly sends reference information to the eNB to make the eNB calculate to obtain the information about the combined channel according to the reference channel information.

Embodiment Three

The present embodiment describes a flow of information interaction of a virtual port node to feed back CRI about the combined channel.

Figure 1:
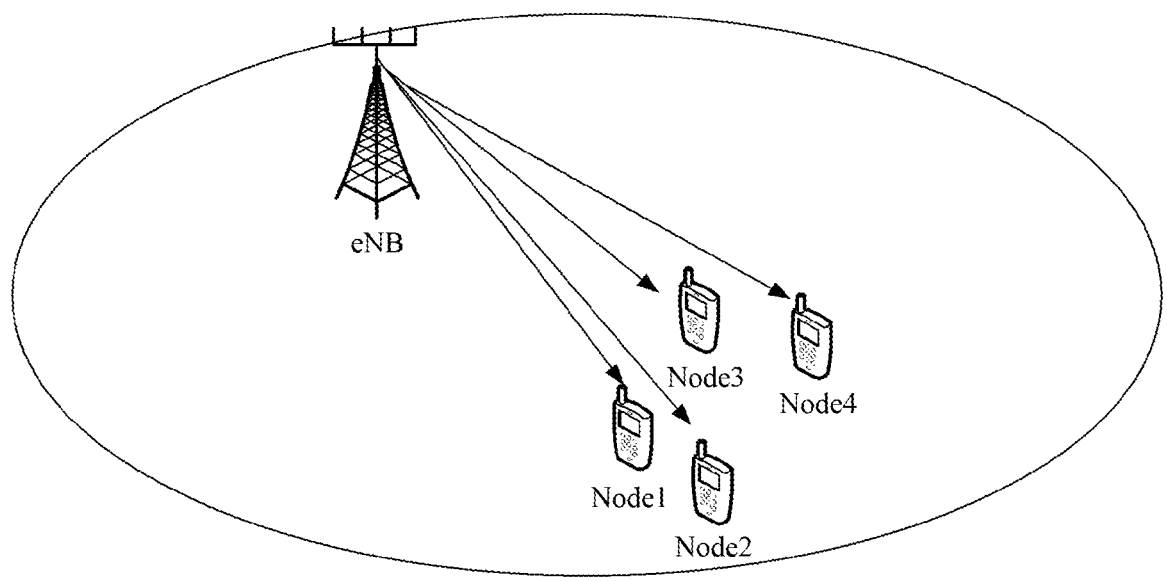
FIG. 1 is a structural diagram of downlink transmission of a homogeneous network in the related art.
Figure 2:
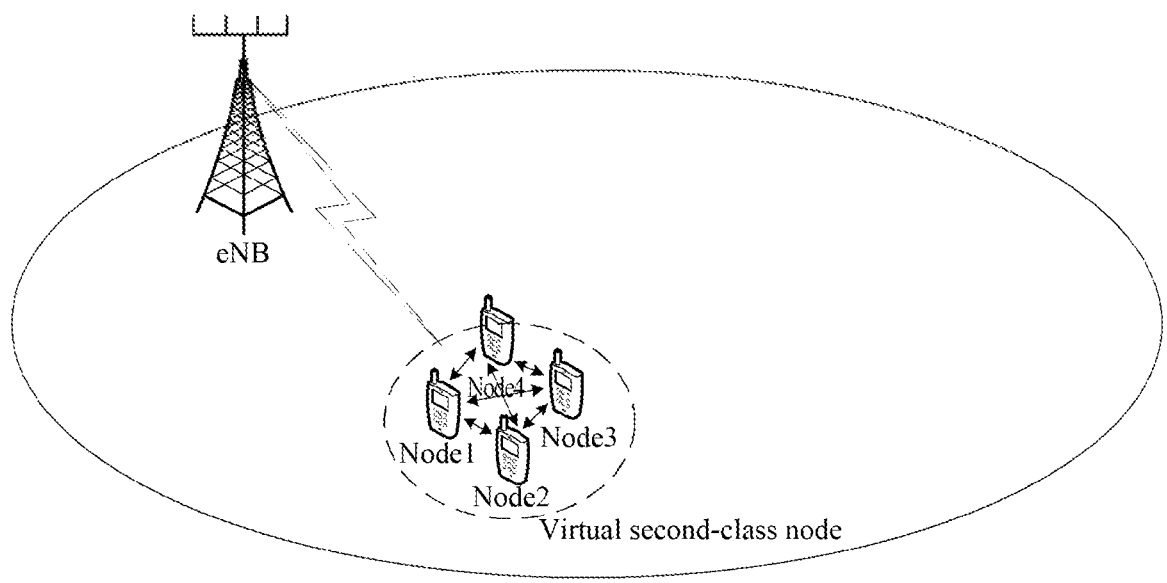
FIG. 2 is a schematic diagram of one virtual MIMO constituted by multiple second-class nodes in the related art.
Figure 3:
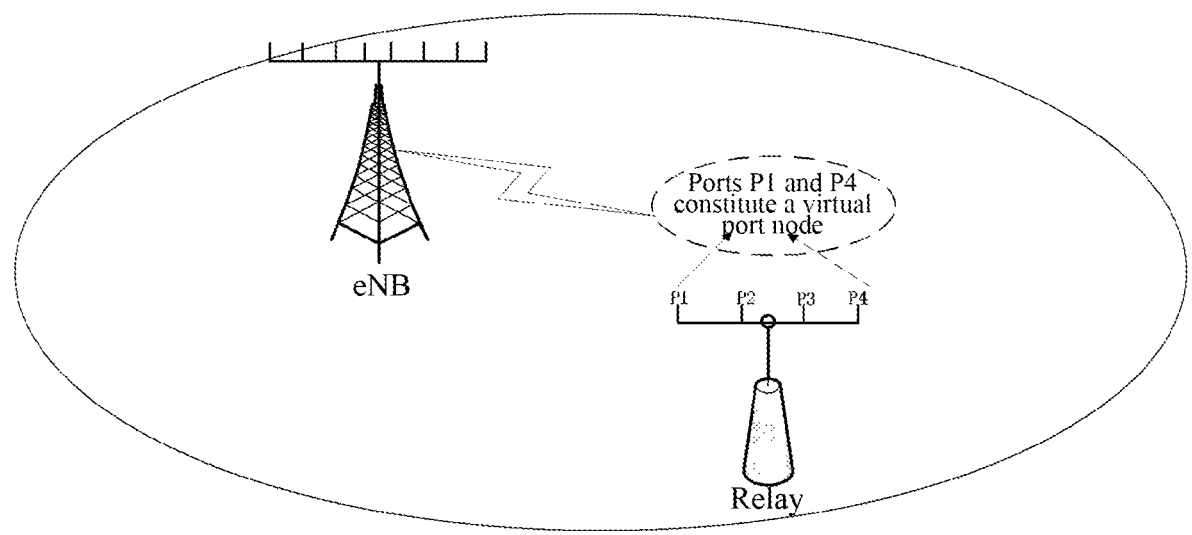
FIG. 3 is a schematic diagram of one virtual MIMO constituted by multiple receiving ports in the related art and embodiment three.

As shown in FIG. 3, there is a relay having many receiving ports. Herein, the first receiving port is P1; the second receiving port is P2; the third receiving port is P3; the fourth receiving port is P4. It is supposed that the ports P1 and P4 constitute a virtual port node in the present embodiment. An eNB sends a CSI-RS to the relay.

The relay receives the CSI-RS, and calculates to obtain a channel between the eNB and the receiving ports P1 and P4. If the relay has other receiving ports, no consideration is taken for the other receiving ports herein, and only a channel H corresponding to the receiving ports constituting the virtual port node is calculated. CRI is calculated by using the channel H. The CRI is fed back to the eNB.

The eNB receives the CRI about the combined channel fed back by the virtual second-class node, and the CRI about the combined channel of the second-class nodes, the virtual second-class node and a virtual port node in each cluster served thereby. An MIMO channel capacity under at least one piece of information about the combined channel is calculated, and an index set of receiving antenna ports corresponding to the information about the combined channel having the maximum channel capacity is served as an MIMO channel configuration. Moreover, the corresponding MIMO configuration is served as the MIMO channel configuration of the eNB.

The eNB sends the MIMO configuration information to the second-class nodes, and sends data to the scheduled second-class nodes according to a transmission mode specified by the MIMO configuration. The second-class nodes perform demodulation and decoding according to the received MIMO configuration information and the received data information. If it is the virtual MIMO, combined demodulation and decoding needs to be performed. Otherwise, only a single second-class node needs to perform demodulation and decoding.

It needs to be noted that the channel capacity here may be other technical indexes such as a signal-to-noise ratio, channel quality, a signal-to-interference and noise ratio, a bit error rate, a block error rate, and a frame error rate.

It needs to be noted that it is only illustrated herein with an example that two receiving ports constitute a virtual port node. However, the present disclosure not only is applied to a situation of two receiving ports, but also may be applied to a situation of more than one receiving port.

It needs to be noted that a situation of two first-class nodes is only listed herein. However, the present disclosure not only is applied to a situation of two first-class nodes, but also may be applied to a situation of more than or equal to one second-class node.

The CRI in the present embodiment includes at least one of CSI, channel information, and a CSI-RS.

Embodiment Four

The present embodiment describes a flow of information interaction of a single second-class node to feed back CRI.

Figure 7:
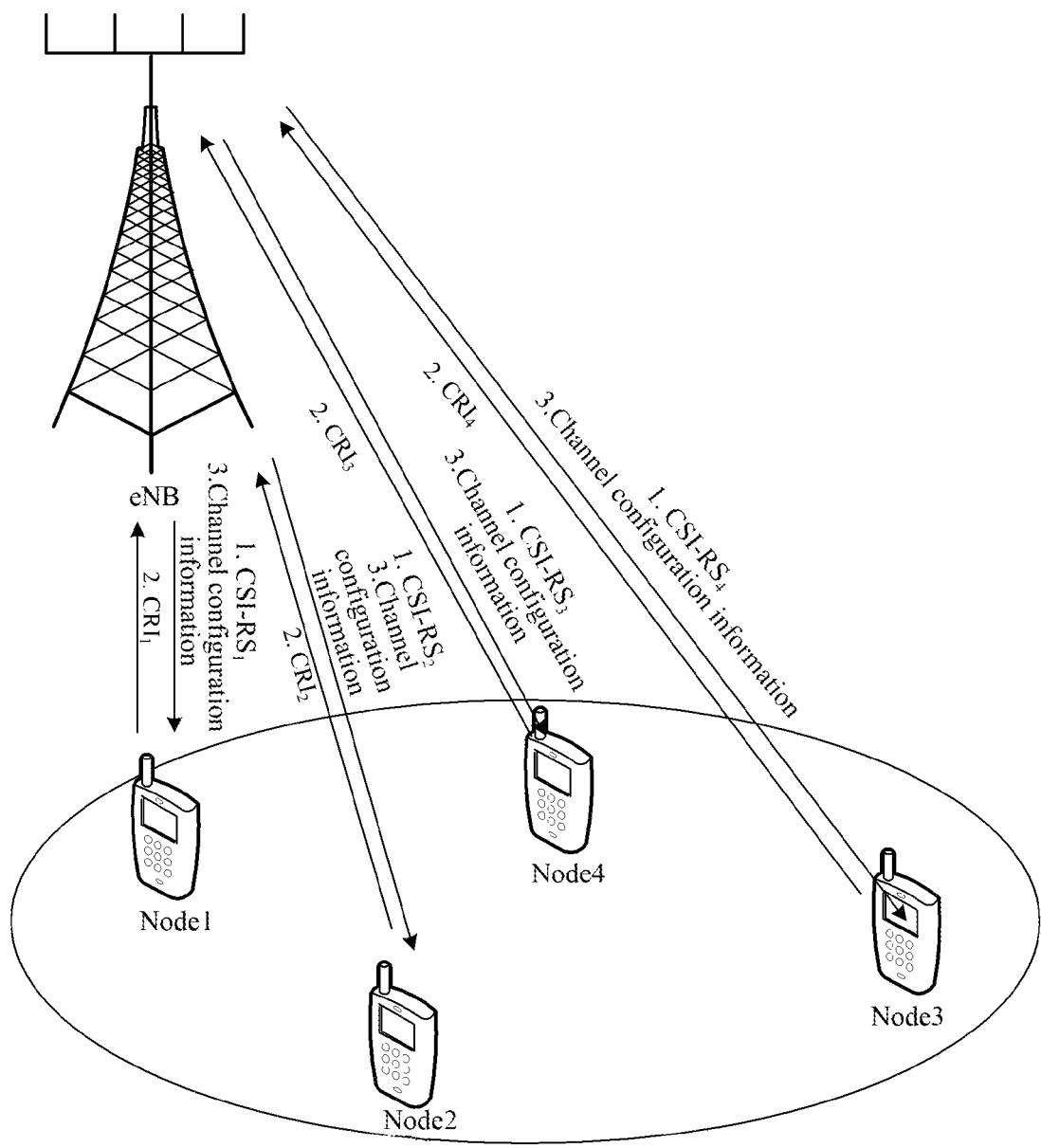
FIG. 7 is a schematic diagram of signaling transmission of a single second-class node according to embodiment four of the present disclosure.

As shown in FIG. 7, an eNB serves N second-class nodes such as node 1, node 2, node 3, and node 4 and so on. The eNB sends a CSI-RS to one of the N nodes.

One of the N nodes receives the CSI-RS, calculates to obtain CRI about a channel between the eNB and the node, and feeds back the CRI to the eNB.

The eNB receives the CRI about the combined channel fed back by the virtual second-class node, and the CRI about the combined channel of the second-class nodes, the virtual second-class node and a virtual port node in each cluster served thereby. An MIMO channel capacity under at least one piece of information about the combined channel is calculated, and an index set of the single second-class node corresponding to the information about the combined channel having the maximum channel capacity is served as an MIMO channel configuration. Moreover, the corresponding MIMO configuration is served as the MIMO channel configuration of the eNB.

The eNB sends the MIMO configuration information to the second-class nodes, and sends data to the scheduled second-class nodes according to a transmission mode specified by the MIMO configuration. The second-class nodes perform demodulation and decoding according to the received MIMO configuration information and the received data information. If it is the virtual MIMO, combined demodulation and decoding needs to be performed. Otherwise, only a single second-class node needs to perform demodulation and decoding.

It needs to be noted that the channel capacity here may be other technical indexes such as a signal-to-noise ratio, channel quality, a signal-to-interference and noise ratio, a bit error rate, a block error rate, and a frame error rate.

It needs to be noted that a situation of two first-class nodes is only listed herein. However, the present disclosure not only is applied to a situation of two first-class nodes, but also may be applied to a situation of more than or equal to one second-class node.

The CRI in the present embodiment includes at least one of CSI, channel information, and a CSI-RS.

An embodiment of the present disclosure also provides a computer-readable storage medium. A computer-executable instruction is stored in the computer-readable storage medium. The computer-executable instruction is used for executing the above-mentioned method.

Those ordinary skilled in the art may understand that all or some of the steps of the above-mentioned embodiment may be implemented by using a computer program flow. The computer program may be stored in a computer-readable storage medium. The computer program is executed on a corresponding hardware platform (such as system, equipment, apparatus, and device). During execution, the computer program includes one of the steps of the method embodiment or a combination thereof.

In an exemplary embodiment, all or some of the steps of the above-mentioned embodiment may also be implemented by using an integrated circuit. These steps may be manufactured into integrated circuit modules respectively, or a plurality of modules or steps therein are manufactured into a single integrated circuit module to be implemented.

Each apparatus/functional module/function unit in the above-mentioned embodiment may be implemented by using a general computation apparatus. They may be centralized on a single computation apparatus or may be distributed on a network composed of a plurality of computation apparatuses.

When each apparatus/functional module/function unit in the above-mentioned embodiment is implemented in a form of a software function module and is sold or used as an independent product, the product may also be stored in a computer-readable storage medium. The above-mentioned computer-readable storage medium may be a read-only memory, a magnetic disk or an optical disk.

Although an implementation mode disclosed in the present disclosure is as above, the content is only the implementation mode adopted to facilitate understanding of the technical solution of the present disclosure, and not intended to limit the scope of protection of the present disclosure. The scope of protection of the present disclosure refers to the scope limited by the appended claims.

INDUSTRIAL APPLICABILITY

According to the signaling transmission method and apparatus for an MIMO system in the embodiments of the present disclosure, a receiving network receives a CSI-RS of a sending network, calculates CRI, and forms CRI about the combined channel by using the calculated CRI; and the sending network forms an MIMO configuration according to the CRI about the combined channel. Therefore, a higher diversity or multiplexing gain can be obtained.

What is claimed is:

1. A signaling transmission method for a Multiple-Input Multiple-Output, MIMO, system, applied to a receiving network side, the method comprising:
    forming Channel-Related Information, CRI, about a combined channel according to CRI between all receiving antenna ports in a receiving network and a sending antenna port in a sending network; and
    sending the CRI about the combined channel to the sending network;
    wherein, the CRI comprises one or more of the following: channel information, Channel State Information, CSI, and a CSI Reference Signal, CSI-RS;
    wherein forming CRI about a combined channel according to CRI between receiving antenna ports in a receiving network and a sending antenna port in a sending network comprises:
    receiving, by the receiving antenna ports, the CSI-RS sent by the sending antenna port;
    determining a receiving antenna port set corresponding to the CRI about the combined channel and a second-class node set corresponding to the receiving antenna port set according to the received CSI-RS;
    determining CRI between the second-class node set and the sending antenna port as CRI about the second-class node set; and forming the CRI about the combined channel according to the CRI about the second-class node set and the receiving antenna ports;

wherein the second-class node set comprises user equipment.

2. The transmission method according to claim 1, wherein when the second-class node set comprises multiple second-class nodes, forming the CRI about the combined channel according to the CRI about the second-class node set and the receiving antenna ports comprises:

calculating, by each second-class node in the second-class node set, to obtain CRI of each receiving port corresponding to the second-class node according to the received CSI-RS, feeding back the CRI of each receiving port of the node to a comprehensive node, and forming, by the comprehensive node, the CRI about the combined channel by taking the CRI of each receiving port of each second-class node as an element of the CRI about the combined channel according to the received CRI of each receiving port of all second-class nodes in the second-class node set;

wherein, the comprehensive node is one of the following: a centralized processing device not connected to a current mobile communication network, or a second-class node in the second-class node set, or a second-class node out of the second-class node set.

3. The transmission method according to claim 1, wherein when the second-class node set comprises a second-class node and the receiving antenna port set comprises all receiving antenna ports of the second-class node, forming the CRI about the combined channel according to the CRI about the second-class node set and the receiving antenna ports comprises:

calculating, by the second-class node, to obtain CRI of each receiving port according to the received CSI-RS, and forming the CRI about the combined channel by taking the CRI of each receiving port of the second-class node as an element of the CRI about the combined channel.

4. The transmission method according to claim 1, wherein when the second-class node set comprises a second-class node and the receiving antenna port set comprises some receiving antenna ports of the second-class node, forming the CRI about the combined channel according to the CRI about the second-class node set and the receiving antenna ports comprises:

calculating, by the second-class node, to obtain CRI of the some receiving ports according to the received CSI-RS, and forming the CRI about the combined channel by taking CRI of each receiving port corresponding to the receiving antenna port set as an element of the CRI about the combined channel.

5. The transmission method according to claim 1, wherein the CRI about the combined channel corresponds to an MIMO channel configuration, and the MIMO channel configuration comprises an index set of second-class nodes, an index set of receiving antenna ports, or an index of a single second-class node.

6. A computer-readable storage medium in which a computer-executable instruction is stored, wherein the computer-executable instruction is used for executing the method according to claim 1.

7. A signaling transmission method for a Multiple-Input Multiple-Output, MIMO, system, applied to a sending network side, the method comprising:

receiving Channel-Related Information, CRI, about a combined channel;

determining an MIMO transmission mode of a receiving antenna port corresponding to the CRI about the combined channel according to the CRI about the combined channel; and determining MIMO channel configuration information of the receiving antenna port;

wherein the MIMO transmission mode comprises a transmission mode of a single second-class node where an index set of a single second-class node corresponding to information about the combined channel having the maximum channel capacity is served as an MIMO channel configuration, an MIMO transmission mode where multiple second-class nodes perform transmission under same time-frequency and receiving antenna ports do not share received data, and an MIMO transmission mode where multiple second-class nodes perform transmission under the same time-frequency and receiving antenna ports share received data.

8. The transmission method according to claim 7, wherein determining an MIMO transmission mode of a receiving antenna port corresponding to the CRI about the combined channel according to the CRI comprises:

calculating a channel capacity of the receiving antenna port corresponding to the CRI about the combined channel; and determining an MIMO transmission mode having a maximum channel capacity, which is obtained by calculation, as the MIMO transmission mode.

9. A signaling transmission apparatus for a Multiple-Input Multiple-Output, MIMO, system, applied to a receiving network side, the apparatus comprising:

a forming unit, arranged to form Channel-Related Information, CRI, about a combined channel according to CRI between all receiving antenna ports in a receiving network and a sending antenna port in a sending network; and a sending unit, arranged to send the CRI about the combined channel to the sending network;

wherein the CRI comprises one or more of the following: channel information, Channel State Information, CSI, and a CSI Reference Signal, CSI-RS;

wherein the forming unit comprises:

a first receiving module, arranged to receive CSI-RS sent by the sending antenna port;

an analysis module, arranged to determine a receiving antenna port set corresponding to the CRI about the combined channel and a second-class node set corresponding to the receiving antenna port set according to the received CSI-RS;

a determination module, arranged to determine CRI between the second-class node set and the sending antenna port as CRI about the second-class node set; and a combined channel forming module, arranged to form the CRI about the combined channel according to the CRI about the second-class node set and the receiving antenna ports;

wherein the second-class node set comprises user equipment.

10. The transmission apparatus according to claim 9, wherein the first receiving module is further arranged to receive MIMO channel configuration information sent by the sending network.

11. A signaling transmission apparatus for a Multiple-Input Multiple-Output, MIMO, system, applied to a sending network, the apparatus comprising:

a receiving unit, arranged to receive Channel-Related Information, CRI, about a combined channel;

a determination unit, arranged to determine an MIMO transmission mode of a receiving antenna port corresponding to the CRI about the combined channel according to the CRI about the combined channel; and an indication unit, arranged to determine MIMO channel configuration information of the receiving antenna port;

wherein the MIMO transmission mode comprises a transmission mode of a single second-class node where an index set of a single second-class node corresponding to information about the combined channel having the maximum channel capacity is served as an MIMO channel configuration, an MIMO transmission mode where multiple second-class nodes perform transmission under same time-frequency and receiving antenna ports do not share received data, and an MIMO transmission mode where multiple second-class nodes perform transmission under the same time-frequency and receiving antenna ports share received data.

12. The transmission apparatus according to claim 11, wherein the determination unit comprises:

a calculation module, arranged to calculate a channel capacity of channel information and/or Channel State Information, CSI, and/or a CSI Reference Signal, CSI-RS, in the CRI about the combined channel; and a comparison module, arranged to determine an MIMO transmission mode having a maximum channel capacity, which is obtained by calculation, as the MIMO transmission mode.

* * * * *